United States Patent
Filbert

(10) Patent No.: US 7,309,438 B2
(45) Date of Patent: Dec. 18, 2007

(54) MITIGATION OF ENVIRONMENTAL POLLUTION

(75) Inventor: Norman V. Filbert, Stevensville, MD (US)

(73) Assignee: ShellBond LLC, Stevensville, MD (US)

( * ) Notice: Subject to any disclaimer, the term of this patent is extended or adjusted under 35 U.S.C. 154(b) by 0 days.

(21) Appl. No.: 11/463,366

(22) Filed: Aug. 9, 2006

(65) Prior Publication Data

US 2007/0090054 A1  Apr. 26, 2007

Related U.S. Application Data

(60) Provisional application No. 60/728,311, filed on Oct. 20, 2005.

(51) Int. Cl.
*C02F 3/00* (2006.01)
(52) U.S. Cl. ............ 210/690; 210/691; 210/692; 210/693; 210/925
(58) Field of Classification Search ........ 210/690–693, 210/925
See application file for complete search history.

(56) References Cited

U.S. PATENT DOCUMENTS

| | | | |
|---|---|---|---|
| 3,755,189 A | 8/1973 | Gilchrist et al. | |
| 3,977,967 A | 8/1976 | Trulson et al. | |
| 4,332,693 A * | 6/1982 | Piepho | 252/181 |
| 4,875,938 A * | 10/1989 | Filbert | 106/764 |
| 5,334,312 A * | 8/1994 | Lajoie | 210/610 |
| 6,811,704 B2 * | 11/2004 | Cho et al. | 210/681 |
| 2005/0087495 A1 * | 4/2005 | Parke | 210/688 |

OTHER PUBLICATIONS

Mahuli, S. et al., "Mechanism of Arsenic Adsorption by Hydrated Lime," Environmental Science and Technology, vol. 31 No. 11, 1997, p. 3226-3230.*

* cited by examiner

*Primary Examiner*—Chester T. Barry
(74) *Attorney, Agent, or Firm*—Roberts Mlotkowski & Hobbes

(57) ABSTRACT

A process for mitigating the pollution caused by a potential polluting agent comprises binding the potential polluting agent with a product obtained by calcining skeletal material and hydrating the calcined skeletal material.

17 Claims, No Drawings

MITIGATION OF ENVIRONMENTAL POLLUTION

FIELD

This application claims priority under 35 USC 120 from U.S. Provisional Application Ser. No. 60/728,311 filed Oct. 20, 2005 and relates to mitigation of environmental pollution, such as pollution caused by oil spills, wastewater treatment and elution from fertilizers, herbicides and pesticides into the soil and groundwater.

BACKGROUND

Incidents of environmental pollution through oil spillage in both fresh and salt water are all too common. Recent history has evidenced the disastrous results that are caused by oil spills. Spilled oil causes damage to marine life, contamination of the water itself damage to the shoreline and damage to birds and other wild life that is dependent upon the contaminated water. Because oil spills cause great losses both environmentally and, of course, financially, processes for remediating the effects of oil spills are in great need.

Several methods of treating oil spills are known. Various mechanical devices such as fences, booms, and skimmers have been used to physically contain or remove oil that has been spilled on a water surface. In addition, several types of oil adsorbents have also been used in the past, such as, for example, straw. Various chemical treatments have also been used to either contain or coagulate spilled oil. For example, U.S. Pat. No. 3,755,189 teaches a composition for the control of oil floating on water that comprises a drying oil, a solvent and a catalyst used in combination as a composition that is able to confine oil that is floating on the surface of water. In addition, U.S. Pat. No. 3,977,967 teaches a method of containing oil spills that uses a polymer of high molecular weight that is able to gel or coagulate the spilled oil such that the coagulated oil can be raked off the surface of the water.

While these existing methods aid in removing spilled oil from the water surface, they fail to provide an adequate environmentally acceptable solution which is able to confine, coagulate and control spilled oil before the oil contaminates adjacent shorelines or drops below the surface of the water and forms an emulsion with the water. Due to the nature of oil and water, i.e. the lighter components of oil typically evaporate from the surface of the water in 24-28 hours, while the heavier components of the oil typically sink below the surface of the water and form an emulsion with the water. Emulsion formation is a particular problem in rough waters and, with current technology, removal of the oil from the contaminated water is virtually impossible once the oil has emulsified. There is therefore a continuing need for improved methods of remediating oil spills.

Another area of environmental concern is the proliferation of wastewater ponds to collect domestic, industrial and agricultural waste. For example, the last decade has witnessed a change in the production of livestock and dairy products from small, family owned units, to large corporate owned farms. As a direct result of this evolution, large wastewater ponds have been constructed to consolidate waste handling and remediation. However, the increased production of these large farms has also resulted in increased waste which directly impacts air and water quality in the surrounding area. Although a variety of methods of remediating the pollution caused by waste collection ponds have been proposed, many are expensive and few allow reuse of the aqueous collection medium after separation of the waste. Again, therefore there is a need for improved methods for mitigating the pollution caused by waste collection ponds.

A further common source of environmental pollution is the build up of nitrogen and other potentially harmful compounds in the soil and groundwater as a result of elution from fertilizers, herbicides and pesticides used in agriculture. In the case of nitrogen compounds, these frequently collect in lakes, ponds, rivers and estuaries increasing the levels of nutrients in the water and thereby allowing the rapid growth and maintenance of elevated population of suspended or filamentous algae. Not only are these algae growths unsightly but they also put stress on the aquatic and fish populations, frequently causing fish kills and the general decline of the quality of a water body. Although various methods have been proposed for denitrification of water and soil, these methods often involve the addition of agents that can themselves provide an additional source of environmental concern. There is therefore a need for improved methods for mitigating the pollution caused by fertilizers, herbicides and pesticides.

In U.S. Pat. No. 4,875,938 there is described a method of making a cementitious binder for use in mortars comprising heating marine shell material to about 2100 to 2350° F. (1150 to 1290° C.); allowing the shell material to cool to ambient temperature; mixing water with the cooled shell material in the ratio of about one part of water by volume to about five parts of shell material by volume; allowing said mixture to spontaneously heat; and monitoring the heat level of said mixture until it commences to cool and as it cools is converted into a dry, substantially white, powdery material that is substantially of the consistency of talcum powder and is useful as a binder in mortar.

Although the mechanism of the processes involved in the production of the cementitious binder described in U.S. Pat. No. 4,875,938 are not fully understood, it is believed that heating of the marine shell to high temperature converts calcium carbonate in the shell to calcium oxide and then the subsequent treatment with water converts the calcium oxide to calcium hydrate, $Ca(OH)_2$, a highly exothermic reaction.

According to the present invention it has now been found that the powdery calcium hydrate product of the process described in U.S. Pat. No. 4,875,938 is effective in mitigating many types of pollution by binding the pollutant in an environmentally safe material. In the case of oil spills, it is found that if the calcium hydrate product is added to a body of water contaminated with oil, either as a surface layer or as an emulsion, the product binds with the oil, causing the oil to separate from the water and fall to the bottom of the body of water with the calcium hydrate product, leaving behind a clear and uncontaminated water layer. Since the calcium hydrate product is produced from shells or similar animal skeletal material, it poses no environmental hazard being left in the water until the oil is removed or is allowed to decay. The calcium hydrate product is similarly effective in binding and separating waste in a collection pond leaving behind a water layer that is sufficiently pure for reuse as a collection medium. In the case of fertilizers, herbicides and pesticides, the binding effect of the calcium hydrate product reduces the rate at which potential pollutants are eluted into the soil and groundwater.

SUMMARY

In its broadest aspect, the invention resides in a process for mitigating the pollution caused by a potential polluting agent, the process comprising binding the potential polluting agent with a product obtained by calcining skeletal material and hydrating the calcined skeletal material.

In a further aspect, the invention resides in a process for removing a potential polluting agent from at or near the surface of a body of water, the process comprising adding to the body of water a product obtained by calcining skeletal material and hydrating the calcined skeletal material.

In one embodiment, the potential polluting agent is an oil spill. In another embodiment, the potential polluting agent is domestic, industrial and/or agricultural waste.

In yet a further aspect, the invention resides in a process for mitigating pollution caused by a compound effective as a fertilizer, herbicide and/or pesticide, the process comprising adding to the compound a product obtained by calcining skeletal material and hydrating the calcined skeletal material.

Preferably, the product is produced by a method comprising:

(a) heating an animal skeletal material to a temperature of at least 1000° C. to convert at least part of the calcium carbonate in the skeletal material to calcium oxide and produce a calcined product; and (b) contacting at least part of said calcined product with water to produce a particulate material containing calcium hydrate.

Conveniently, said skeletal material is an exoskeletal material, such as the shell of a marine animal or a poultry egg.

Conveniently, the process also comprises adding to the body of water an enzyme effective to breakdown oil.

DETAILED DESCRIPTION OF THE EMBODIMENTS

This invention relates to a process for removing oil from at or near the surface of a body of water, either freshwater or seawater, in which a calcium hydrate product, nominally $Ca(OH)_2$, produced by calcining and then hydrating skeletal material is applied to the water surface.

The skeletal material used to produce the calcium hydrate can be either part or all of the endoskeletal material of an animal, such as the bones of a domestic or farm animal, such as a cow, or can be an exoskeletal material, such as the shell of a marine animal or the shell of a bird's egg, such as a poultry egg. Particularly preferred skeletal materials include marine shells, such as clam and oyster shells, and poultry egg shells.

The skeletal material is initially heated in a suitable kiln to a temperature of at least 1000° C., for example from 1100° C. to 1500° C., typically from 1150° C. to 1300° C. to remove organic material and to convert at least part, and preferably all, of the calcium carbonate in the skeletal material to calcium oxide. In this respect, there is no requirement that the skeletal material be separated from the rest of the animal before being heated in the kiln since, at the high temperatures involved, all residual organic material will be burned off. In addition, the skeletal material can be introduced into the kiln without prior treatment or, more preferably, can be crushed, chopped or otherwise comminuted before being introduced into the kiln.

The time required for the conversion of the skeletal material to calcium oxide will depend on many factors, including the rate of heating and final temperature of the kiln, the type of skeletal material and the degree of conversion sought. In general, however, the skeletal material need only be heated to the appropriate final temperature and does not need to stay at that temperature for any length of time for significant conversion of the calcium carbonate in the skeletal material to calcium oxide. When the calcination is complete, the skeletal material is allowed to cool throughout back down to ambient temperature. The skeletal material at this stage can be coarse, or granular substance in which, in the case of marine shells being used as the skeletal material, recognizable flakes of the shells in their respective colors, e.g., white for clam and egg shell, cinnamon or brownish for oyster shells, etc. can be readily detected.

After the calcined skeletal material has cooled to, or approaching, ambient temperature, water, which can be either fresh or saline and can even be taken directly from a brackish source, such as a bay, or from the open ocean, is mixed with the calcined skeletal material to convert the calcium oxide to calcium hydrate, $Ca(OH)_2$. As is well known, this hydration reaction is highly exothermic and can result in a rapid rise in the temperature of the skeletal material/water mixture and the evolution of steam. The relative ratio of the water to the calcined skeletal material is not critical but in general at least 1 part by volume, preferably 2 to 8 parts by volume, more preferably 4 to 6 parts by volume, most preferably about 5 parts of the calcined skeletal material are mixed with 1 part by weight of water.

The temperature of the mixture of water and calcined skeletal material is monitored and typically rises spontaneously to almost 100° C. and then remains at this level for a period of time as the hydration reaction proceeds. When hydration is complete, the temperature starts to fall and, at a visually recognizable point during this fall of the temperature, the previously coarse, vari-colored calcined skeletal material converts, without further treatment as by crushing in a ball mill, into a white or substantially white homogeneous, fluffy powdery calcium hydrate.

In one embodiment, the resultant calcium hydrate powder is used to remediate an oil spill on a body of water by distributing the powder directly over the surface of the water affected by the spill. Irrespective of whether the oil is present as a discrete layer on the surface of the water or has become emulsified with water, the powder binds with the oil and causes the oil to separate from the water and sink to the bottom of the body of water with the calcium hydrate. Since the calcium hydrate is produced from shells or similar animal skeletal material, it poses no environmental hazard being left on the water bottom, whereas the oil will gradually decompose through the action of enzymes in the water.

The amount of calcium hydrate powder required to remediate a particular oil spill is not closely controlled and will, for example, depend on the type and amount of oil in the spill, the water conditions, and whether the oil has emulsified. In general, however, it is normally sufficient to add between about 8 and about 32 fluid oz (225 and 910 ml) of calcium hydrate powder per square meter of contaminated water.

It is to be appreciated that the present remediation process can be used as the primary method of removing an oil spill from the surface of a body of water or alternatively can be used as a secondary remediation method after other methods, such as skimmers, coagulants, and/or adsorbents, have been used to remove some or all of the free floating oil, leaving only emulsified oil that is difficult to remove by conventional techniques. Adding the calcium hydrate powder described herein will break the emulsion, causing the oil to separate from the water and fall to the water bottom.

The calcium hydrate powder can be used alone to remediate oil spills or can, for example, be combined with any known environmentally safe enzyme, directly or as a slurry mixture, which facilitates the breakdown of oil when spread over the oil surface. Then, after the calcium hydrate powder has been used to separate and sink the oil, the calcium hydrate, now combined in the oil, is a new product in the marine food chain, acting as an electrolyte, is the underwater "binder agent" which accelerates the decomposition of the oil.

In another embodiment, the calcium hydrate product described above is used to remediate a waste treatment pond used, for example, to collect domestic, industrial and/or agricultural waste. Again, the calcium hydrate product is effective in binding to the waste, causing the waste to coagulate, separate from the water and sink to the bottom of the pond, leaving behind a clear water layer that can be reused after removal of the waste/calcium hydrate sludge.

In a further embodiment the calcium hydrate product can be used as a binder for a fertilizer, herbicide and/or pesticide to reduce the rate of elution of nitrogen and other environmentally harmful compounds into the soil and groundwater. In this case, the calcium hydrate product can be mixed with the fertilizer, herbicide and/or pesticide before the latter is used in agriculture or can be applied to a field after treatment with the fertilizer, herbicide and/or pesticide.

The invention will now be more particularly described with reference to the following Example.

EXAMPLE 10 lbs (4.5 kg) of oyster shells are placed in a kiln and are heated to 2150° F. to 2350° F. (1177° C. to 1288° C.). The kiln is then turned off and allowed to cool to room temperature. After cooling, the heated shell, which is in the form of coarse cinnamon or brownish flakes, is removed from the kiln and placed in a bucket. Water is added to the bucket in amount to provide about five parts by weight of heated shell to each part by weight of water. The temperature of the water rapidly rises to almost 100° C., with significant amounts of steam being emitted from the bucket. The temperature in the bucket then begins to fall and after the temperature returns to ambient the contents of the bucket are removed and found to be in the form of a fine white or substantially white homogeneous, powder. The yield of the fine white powder, calcium hydrate, is about 8 lbs (3.6 kg).

To a film of marine engine oil on the surface of a small stretch of water in a marina is added ⅓ lb (150 g) of the powder produced as above. The oil immediately sinks to the bottom leaving the surface of the water free of any visible trace of the oil film.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

I claim:

1. A process for mitigating the pollution caused by a potential polluting agent, the process comprising binding the potential polluting agent with a product obtained by calcining skeletal material at a temperature of at least 1000° C. and hydrating the calcined skeletal material.

2. The process of claim 1 wherein the skeletal material is endoskeletal material.

3. The process of claim 1 wherein the skeletal material is exoskeletal material.

4. The process of claim 3 wherein the exoskeletal material comprises a shell of a marine animal or a poultry egg.

5. A process for removing a potential polluting agent from at or near the surface of a body of water, the process comprising adding to the body of water a product obtained by calcining skeletal material at a temperature of at least 1000° C. and hydrating the calcined skeletal material.

6. The process of claim 5 wherein the potential polluting agent is an oil spill.

7. The process of claim 6 wherein the oil is present in the water as an emulsion.

8. The process of claim 5 wherein the potential polluting agent is domestic, industrial and/or agricultural waste.

9. The process of claim 5 wherein the skeletal material is endoskeletal material.

10. The process of claim 5 wherein the skeletal material is exoskeletal material.

11. The process of claim 10 wherein the exoskeletal material comprises a shell of a marine animal or a poultry egg.

12. A process for mitigating pollution caused by a compound effective as a fertilizer, herbicide and/or pesticide, the process comprising adding to the compound a product obtained by calcining skeletal material at a temperature of at least 1000° C. and hydrating the calcined skeletal material.

13. The process of claim 12 wherein the skeletal material is endoskeletal material.

14. The process of claim 12 wherein the skeletal material is exoskeletal material.

15. The process of claim 14 wherein the exoskeletal material comprises a shell of a marine animal or a poultry egg.

16. The process of claim 1 wherein the process is for mitigating the pollution of water caused by a polluting agent selected from oil and agricultural waste.

17. The process of claim 5 wherein said product consists essentially of a composition obtained by calcining skeletal material at a temperature of at least 1000° C. and hydrating the calcined skeletal material.

* * * * *